Jan. 5, 1932.   A. VEILLETTE   1,839,280
SPECTACLES
Filed Oct. 13, 1927
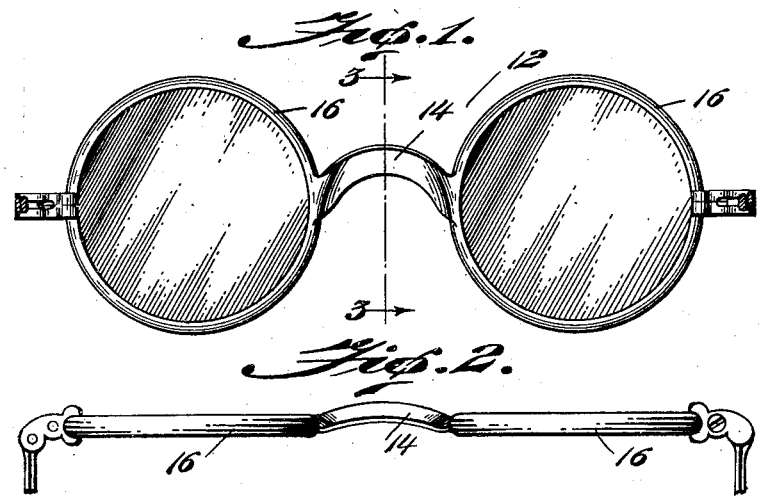
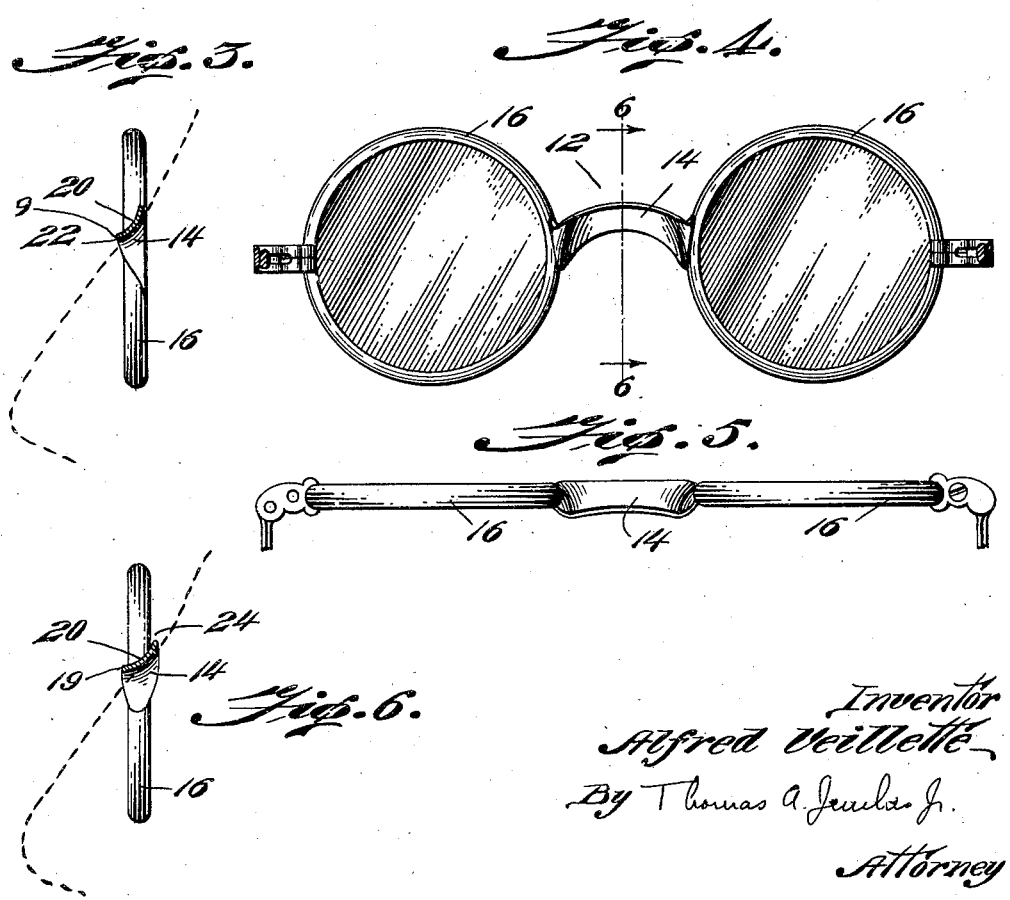
Inventor
Alfred Veillette
By Thomas A. Jenks Jr.
Attorney Patented Jan. 5, 1932

1,839,280

UNITED STATES PATENT OFFICE

ALFRED VEILLETTE, OF ATTLEBORO, MASSACHUSETTS

SPECTACLES

Application filed October 13, 1927. Serial No. 226,004.

My invention relates to spectacles and spectacle frames and includes novel improvements in certain features thereof, particularly in the bridge member thereof.

An object of my invention is to provide a novel type of bridge particularly adapted for use in spectacle frames constructed of very thin material. In order to strengthen the bridge member made of very thin material, I preferably construct the bridge member transversely arched and substantially semi-circular in section. It is well known architecturally that an arch construction is a relatively stronger construction than a straight line construction, thereby providing a greater strength to a bridge construction. As the bridge is semi-circular it is obvious that it is of tubular construction, which construction is easy to fabricate. A further object of my invention is to substantially eliminate any necessity for the shanks now projecting inwardly from each lens frame to which the bridge is attached by substantially constructing the bridge in substantially the same plane as the lens rims. A further feature of my invention is to forwardly bevel and fashion the lower edge of the arch so that it compactly conforms to the wearer's nose and if desired to slightly offset it, thus tilting the bridge from the plane of the lens frame to compensate for differences in human noses and vision.

Further objects of my invention relate to the provision of a simple novel type of lens frame which may be readily fabricated to accomplish the results hitherto portrayed.

These and such other objects of my invention as may hereinafter appear will be best understood from a description of the accompanying drawings, which illustrate various embodiments thereof.

In the drawings, Fig. 1 is a rear elevation of a spectacle constructed in accordance with the teachings of my invention, the temples being shown in section.

Fig. 2 is a plan view thereof.

Fig. 3 is a sectional view taken along the line 3—3 of Fig. 1.

Fig. 4 is a rear elevation similar to Fig. 1, of a modified form of my invention in which the tilted transversely arched bridge is slightly offset from the plane of the spectacle frame.

Fig. 5 is a plan view of the embodiment shown in Fig. 4.

Fig. 6 is a section taken along the line 6—6 of Fig. 4.

In the drawings, wherein like characters of reference indicate like parts throughout, 12 generally indicates a spectacle constructed in accordance with the teachings of my invention.

As stated, my invention relates particularly to novel features in spectacle frame construction. As stated, my invention is particularly adapted for use in frames that are constructed of very thin metallic material. To these ends I particularly eliminate the material formerly used in making the so-called bridge shanks and attach the bridge 14 directly to the lens rims 16. In order to strengthen the construction of the normally thin bridge, I preferably transversely arch it as at 20 as shown in detail in Fig. 3 and as stated a transversely arched bridge is substantially semicircular in section and may be easily fabricated out of tubular or flat stock preferably by a pressing operation. After the bridge has been duly shaped each end thereof is suitably non-extensibly soldered or otherwise secured to each lens rim. In order that the lower edge 22 of the arch may compactly fit the nose I preferably forwardly bevel the lower end 19 or otherwise fashion it for this purpose. It is a well-known optical fact that different eyes have different focal points and that the lenses must be adjusted at the desired distances therefrom. I therefore may as shown in the modification in Figs. 4-6 slightly offset the edge of the bridge as at 24 from the plane of the lens frame for this purpose. While the embodiment shown in Fig. 6 is inset, it is apparent that the bridge may be outset relative to the plane of the frame. It is thus apparent that I have provided a novel type of bridge constructed of relatively thin material which eliminates the use of bridge shanks generally thought necessary, is inherently strong due to its arch construction, which is fashioned to fit any desired form of nose and which may be inset or outset from the plane of the lens frame to compensate for relative differences in human noses and vision, as more particularly shown in Fig. 6.

As stated, the bridge member of my invention is constructed of relatively thin metallic material transversely arched and substantially semi-circular in section. The bridge may be pressed or otherwise formed out of tubular or flat stock. This stock may consist of a single metal layer or of a plurality of different metal layers, such as brass and silver, duly soldered and pressed together to form a single unitary layer of stock, though in reality composed of different layers. In the trade, however, this type of stock is known as flat or tubular stock. I therefore in the claims employ the words "relatively thin" to signify that the bridge member of my invention is constructed out of a single layer of this so-called flat or tubular stock.

It is understood that my invention is not limited to the embodiments shown and that various deviations may be made therefrom without departing from the spirit and scope of the appended claim.

What I claim is:

A metallic spectacle frame comprising two metallic lens rims, a relatively thin metallic bridge member having each end thereof non-extensibly joined to each lens rim in a plane substantially even therewith and a center portion adapted to rest on the nose transversely arched and substantially semi-circular in section obliquely forwardly bent relative to the ends thereof and to the plane of said lens rims with the lower edge thereof so forwardly bent and fashioned to compactly rest on the nose.

In testimony whereof I affix my signature.

ALFRED VEILLETTE.